(12) United States Patent
Du (10) Patent No.: US 8,443,421 B2
(45) Date of Patent: May 14, 2013

(54) METHOD AND APPARATUS FOR IMPLEMENTING COMMUNICATION OF STAND-ALONE SOFTWARE

(75) Inventor: Bin Du, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/995,391

(22) PCT Filed: Sep. 3, 2010

(86) PCT No.: PCT/US2010/047783
§ 371 (c)(1),
(2), (4) Date: Nov. 30, 2010

(87) PCT Pub. No.: WO2011/056289
PCT Pub. Date: May 12, 2011

(65) Prior Publication Data
US 2012/0222088 A1    Aug. 30, 2012

(30) Foreign Application Priority Data
Nov. 5, 2009 (CN) .......................... 2009 1 0208728

(51) Int. Cl.
*H04L 29/06* (2006.01)
(52) U.S. Cl.
USPC .............................................. 726/3; 709/206
(58) Field of Classification Search ....... 726/3; 709/206
See application file for complete search history.

(56) References Cited

U.S. PATENT DOCUMENTS

| | | | |
|---|---|---|---|
| 6,246,688 B1 | 6/2001 | Angwin et al. | |
| 6,718,175 B1 | 4/2004 | Edstam | |
| 6,898,623 B1 | 5/2005 | Williams et al. | |
| 7,074,999 B2 | 7/2006 | Sitrick et al. | |
| 7,496,578 B2 | 2/2009 | O'Brien et al. | |
| 7,660,904 B2 * | 2/2010 | Qureshi et al. | 709/229 |
| 7,836,136 B1 * | 11/2010 | Alfke | 709/206 |
| 2004/0034776 A1 * | 2/2004 | Fernando et al. | 713/171 |
| 2005/0086309 A1 | 4/2005 | Galli et al. | |
| 2005/0273496 A1 * | 12/2005 | Jean et al. | 709/206 |
| 2006/0036692 A1 | 2/2006 | Morinigo et al. | |
| 2006/0059237 A1 * | 3/2006 | Wilcox | 709/206 |
| 2007/0073840 A1 | 3/2007 | O'Brien et al. | |
| 2007/0174765 A1 | 7/2007 | Schleppenbach et al. | |
| 2008/0250111 A1 | 10/2008 | Chen et al. | |
| 2009/0015567 A1 | 1/2009 | Abdelbaki et al. | |
| 2009/0043854 A1 | 2/2009 | Wiles | |
| 2009/0150499 A1 * | 6/2009 | Partridge et al. | 709/206 |
| 2010/0131652 A1 | 5/2010 | Brewis et al. | |
| 2010/0235430 A1 | 9/2010 | Kim | |

* cited by examiner

*Primary Examiner* — Michael Pyzocha
(74) *Attorney, Agent, or Firm* — Lee & Hayes, PLLC (57) ABSTRACT

The present disclosure discloses a method and apparatus for implementing communication of stand-alone software applications. In one aspect, a method for implementing communication of stand-along software applications comprises: establishing an instant communication connection between a first user device and a second user device by a first instant communication client on the first user device and a second instant communication client on the second user device, the first user device and the second user device being remote from each other; and communicating, by a first stand-alone software application on the first user device, with a second stand-alone software application on the second user device via the instant communication connection.

20 Claims, 3 Drawing Sheets

METHOD AND APPARATUS FOR IMPLEMENTING COMMUNICATION OF STAND-ALONE SOFTWARE

CROSS REFERENCE TO RELATED PATENT APPLICATIONS

This application is a national stage application of an international patent application PCT/US10/47783, filed Sep. 3, 2010, which claims priority from Chinese Patent Application No. 200910208728.2 filed on Nov. 5, 2009, entitled "METHOD AND APPARATUS FOR IMPLEMENTING COMMUNICATION OF STAND-ALONE SOFTWARE," which applications are hereby incorporated in their entirety by reference.

TECHNICAL FIELD

The present disclosure relates to computer application technology, and particularly relates to a method and apparatus for implementing communication of stand-alone software.

BACKGROUND

With the development of internet technology, the demands made by users to various software applications software applications are not limited in the form of stand-alone functions. More and more users desire that software applications have certain network functions to allow interaction with a remote user based on basic functions of the software applications.

The demands made by users to more software functions also increase difficulties for software development. In the case of software for a single personal computer, for the purpose of implementing network functions, a relevant communication function module has to be added into the software. Compared with stand-alone functions, the implementation of network functions makes a higher demand for development personnel and development environment. Thus, to implement network functions in stand-alone software, it will apparently increase the development difficulty and development cost, and thereby restricting the development personnel to a certain extent. In addition, different development personnel may use different network environments when developing or testing software applications. It is inevitable that the users would meet the compatibility problem when using the network functions, thereby often requiring the users to make different network configurations for different software applications, resulting in increased difficulties in operation.

SUMMARY OF THE DISCLOSURE

The present disclosure provides techniques for implementing communication of stand-alone software to resolve the problems for a stand-alone software application to implement network functions. Such problems include high difficulty, high cost, and low compatibility. Various aspects of the techniques are summarized below.

In one aspect, a method for implementing communication of stand-along software applications comprises: establishing an instant communication connection between a first user device and a second user device by a first instant communication client on the first user device and a second instant communication client on the second user device, the first user device and the second user device being remote from each other; and communicating, by a first stand-alone software application on the first user device, with a second stand-alone software application on the second user device via the instant communication connection.

In communicating with a second stand-alone software application on the second user device via the instant communication connection, the method may: receive, by the first instant communication client, a communication request from the first stand-alone software application; authenticate the first stand-alone software application by the first instant communication client; and when the first stand-alone software application passes the authentication, permit the first stand-alone software application to communicate with the second stand-alone software application via the instant communication connection.

The communication request may include an identification of the second user device. When permitting the first stand-alone software application to communicate with the second stand-alone software application via the instant communication connection, the method may include: after the first stand-alone software application passes the authentication, the first instant communication client checking whether the instant communication connection exists between the first instant communication client and the second instant communication client according to the identification of the second user device; if affirmative, permitting the first stand-alone software application to communicate with the second stand-alone software application via the instant communication connection; and if not affirmative, the first instant communication client establishing the instant communication connection with the second instant communication client according to the identification of the second user device, and permitting the first stand-alone software application to communicate with the second stand-alone software application via the instant communication connection.

In communicating with a second stand-alone software application on the second user device via the instant communication connection, the method may include: the first instant communication client establishing the instant communication connection with the second instant communication client; the first instant communication client starting the first stand-alone software application on the first user device; the first instant communication client sending the communication request for one or more stand-alone software applications to the second instant communication client, the communication request for one or more stand-alone software applications including an identification of the first stand-alone software application; the second instant communication client receiving the communication request for one or more stand-alone software applications; the second instant communication client starting the second stand-alone software application on the second user device according to the identification included in the communication request for one or more stand-alone software applications; and the first stand-alone software application communicating with the second stand-alone software application via the instant communication connection established by the first instant communication client and the second instant communication client.

Regarding starting the first stand-alone software application on the first user device, the method may include: the first instant communication client establishing an extended window of a instant communication chatting window; and the first instant communication client starting the first stand-alone software application at the extended window.

Alternatively, regarding starting the first stand-alone software application on the first user device, the method may include: the first instant communication client starting multiple stand-alone software applications on the first user device at the extended window; or the first instant communication client starting multiple stand-alone software applications at different extended windows.

Prior to the first instant communication client sending the communication request for one or more stand-alone software applications to the second instant communication client, the method may further include: the first instant communication client checking whether the first stand-alone software application needs to be used by a user through a network interaction; and when the first stand-alone software application needs to be used by a user through a network interaction, the first instant communication client sending the communication request for one or more stand-alone software applications to the second instant communication client.

In another aspect, an apparatus includes a connection establishment unit, a request receiving unit, and an authentication communication unit.

The connection establishment unit may establish an instant communication connection between a local user device and a remote user device.

The request receiving unit may receive a communication request from a first stand-alone software application at the local user device.

The authentication communication unit may authenticate the first stand-alone software application, in an event that the first stand-alone software application passes the authentication. The authentication communication unit may permit the first stand-alone software application to communicate with a second stand-alone software application at the remote user device via the instant communication connection.

In yet another aspect, an apparatus for implementing communication of stand-alone software at a local user device and a remote user device includes: a connection establishment unit, a stand-alone software starting unit, a request sending unit, and a request receiving unit.

The connection establishment unit may establish an instant communication connection between the local user device and the remote user device.

The stand-alone software start unit may start a first stand-alone software application on the local user device. The stand-alone software start unit may include: an extended window creation sub-unit that creates an extended window of a chatting window for instant communication; and a starting sub-unit that starts the stand-alone software in the extended window.

The request sending unit may send a first communication request to the remote user device for communication with a second stand-alone software application on the remote user device. The first communication request may include an identification of the first stand-alone software application.

The request receiving unit may receive a second communication request from the remote user device for communication with the first stand-alone software application. The second communication request may include an identification of the second stand-alone software application.

The stand-alone software starting unit may start the first stand-alone software application on the local user device in response to the request receiving unit receiving the second communication request from the remote user device for communication with the first stand-alone software application.

In the techniques provided by the present disclosure, stand-alone software uses a network connection established by an instant communication system to conduct communication, and thus there is no requirement for a communication function module in the stand-alone software. It effectively reduces development difficulty and development cost to implement network functions at the stand-alone software. In addition, as various stand-alone software applications uniformly use the network connection established by the instant communication system, there only needs one-time configuration to implement normal communication of the various stand-alone software applications, thereby reducing operations of user.

BRIEF DESCRIPTION OF THE DRAWINGS

To better illustrate embodiments of the present disclosure, the following is a brief introduction of Figures to be used in descriptions of the disclosed embodiments. The following Figures only relate to some embodiments of the present disclosure.

DETAILED DESCRIPTION

A technique for implementing communication of stand-alone software is firstly introduced herein. The technique establishes an instant communication connection between a first user device and a second user device, and allows communication between a stand-alone software application A1 on the first user device and a stand-alone software application A2 on the second user device using the instant communication connection.

The first user device and the second user device are remote to each other. The instant communication connection between the first user device and the second user device is established by an instant communication client B1 on the first user device and an instant communication client B2 on the second user device. Instant communication clients B1 and B2 are also a form of software application. In one embodiment, the stand-along software application A1 on the first user device and the stand-along software application A2 on the second user device are identical.

In the above-described technique, each stand-alone software application uses the network connection established by an instant communication system to communicate, thereby eliminating a need for the stand-alone software application to be equipped with a communication function module. From a perspective of development personnel, the development personnel can focus on an implementation of basic functions of the stand-alone software application and not the communication or network functions. With respect to the implementation of network functions, the development personnel can leave an interface capable to interact with the instant communication system. Even relatively more complicated network functions can be implemented by an instant communication server, thereby effectively reducing development difficulty and development cost for the stand-alone software application to implement network functions.

On one hand, under the current technologies, as different development personnel use different network environments when developing or testing software applications, a user would inevitably face compatibility problem when using the network functions. Implementation of techniques provided by the present disclosure would allow multiple stand-alone software applications to use the network connection uniformly established by the same instant communication system. Thus there is no need to configure communication for a given stand-along software application, thereby simplifying user operations.

On the other hand, under the current technologies, due to limitations arising from development difficulty and development cost, many network functions implemented in stand-alone software applications may not take into considerations of communication security and exception handling. The disclosed instant communication system, however, generally has a relatively mature communication security and exception handling mechanisms. Thus, an application of the techniques disclosed by the present disclosure can effectively improve a reliability of communication of stand-alone software applications.

To better illustrate embodiments of the present disclosure or technology plans of the current technologies, the following descriptions are described with reference to the Figures to provide a clear and complete description. The Figures only relate to some embodiments of the present disclosure instead of all possible embodiments. Modifications or derivatives made by a person of ordinary skill in the art based on the embodiments disclosed herein fall within a protection scope of the present disclosure.

FIRST EXAMPLE

Figure 1:
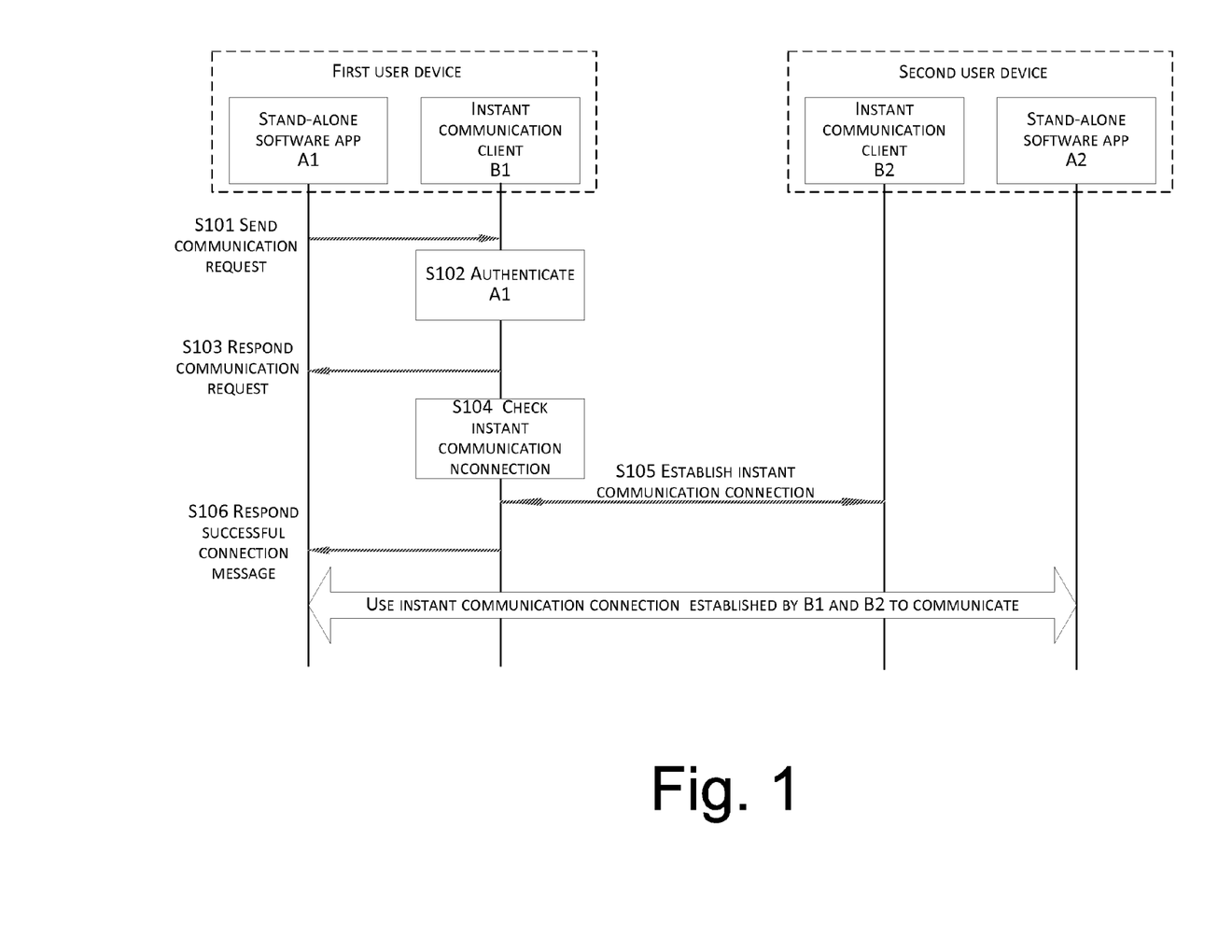
FIG. 1 illustrates a diagram of a method for communication of stand-alone software in accordance with a first embodiment of the present disclosure.

In a first embodiment, a first user device and a second user device are related communication entities. In a communication process, the first user device and the second user device are remote to each other. The first user device comprises two components: a stand-alone software A1 application and an instant communication client B1. The second user device also comprises two components: a stand-alone software A2 application and an instant communication client B2. Instant communication clients B1 and B2 belong to one and the same instant communication system. Software applications A1 and A2 are identical. Software applications A1 and A2 communicate through an instant communication connection established by instant communication clients B1 and B2. FIG. 1 illustrates an implementation of a method of this embodiment. The method is described below.

S101: Software application A1 sends a communication request to instant communication client B1.

In this embodiment, although each stand-along software application can still logically have a communication module, the communication module does not directly interact with a network. When the software application has a communication requirement, it firstly sends the communication request to the instant communication client B1 on a local user device.

To ensure that the stand-alone software application can correctly use the instant communication connection to communicate, the stand-along software application and the instant communication client on the same user device have a corresponding relationship. The instant communication client not only has basic instant communication functions but also has pre-defined special local communication interface to implement an internal message interaction between an instant communication software process and a stand-alone software process. When implementing the network functions of the stand-alone software application, the local communication interface defined by the instant communication client can be relied on without involving an interaction portion with the network. Appreciatively, one stand-alone software application can choose to use multiple instant communication software applications for communication while one instant communication software application can also support communication with multiple stand-alone software applications.

Assuming that the stand-alone software application is a game software, a local user desires to have a game with another user through the network. After choosing a corresponding network function, such as requesting to have an online game with another user or searching opponents of the online game, software application A1 sends a communication request to the corresponding instant communication client B1 of the local user device. The above situation presupposes that instant communication client B1 already runs on the local user device. In a detailed implementation scenario, before sending the communication request, software application A1 can firstly check whether there is a corresponding instant communication client running on the local user device. If not, it can automatically start the corresponding instant communication client or sends a notification message to the user to notify the user to manually start the corresponding communication client.

S102: After receiving the communication request from software application A1, instant communication client B1 authenticates software application A1.

For security purpose, after receiving the communication request from software application A1, instant communication client B1 can further determine whether to allow software application A1 to use the instant communication connection to communicate. The authentication can be implemented in one of several ways. For example, instant communication client B1 can prompt relevant information to the user for confirmation. Or instant communication client B1 can request software application A1 to provide corresponding authentication information to confirm an identity of the current user. The authentication information can be the same user name or password as that of an instant messaging account. Software application A1 can also directly include the corresponding authentication information within the communication request sent at step S101.

It is appreciated that this step can also be used for checking compatibility. In S101, when software application A1 sends the communication request to instant communication client B1, software application A1 actually determines that instant communication client B1 can implement the network functions. In this step, instant communication client B1 can further determine whether it can support communication of software application A1. For example, instant communication client B1 can determine by checking an edition number or revision number, or by sending specific testing data. A combination of this step and S101 is equivalent to implementing a dual connection compatibility check between software application A1 and instant communication client B1 to ensure that software application A1 can correctly use the instant communication connection with instant communication client B1 to communicate.

S103: Instant communication client B1 sends a communication request to software application A1 to respond.

This step is optional. If software application A1 passes the authentication of instant communication client B1, instant communication client B1 can inform software application A1 that the authentication is successful in the response message and continue to implement subsequent steps. If software application A1 does not pass the authentication, instant communication client B1 will refuse the communication request of software application A1 and send the response message to inform software application A1. The response message can further include a cause for refusal, such as an illegal identification of the user or incompatibility of software edition.

S104: Instant communication client B1 checks whether there exists a instant communication connection with the remote device.

After software application A1 passes the authentication, instant communication client B1 permits software application A1 to use the instant communication connection to communicate. There can be further situations in the detailed implementation as discussed below.

(1) The local user desires to have a communication with a designated user and there already exists an instant communication connection between the local user device and a device of the designated user (such as chatting between the two). In this situation, software application A1 can directly use the current instant communication connection to communicate with the other remote device. Correspondingly, the other remote device can also start a corresponding stand-alone software application, referred to as software application A2. In other words, software applications A1 and A2 communicate with each other through an instant communication connection established by a local instant communication client B1 with a remote instant communication client (referred to as instant communication client B2). It is appreciated that, at the other end, software application A2 and instant communication client B2 can also implement similar authentication operations as in S102, which will not be repeated herein in the interest of brevity.

(2) The local user desires to have a communication with the designated user and there does not exist an instant communication connection between the local user device and a device of the designated user.

(3) The local user desires to find a communication party at random, such as randomly finding an opponent in an online game. In such a situation, there does not yet exist an instant communication connection between the local user device and the randomly found communication party.

In a practical implementation, software application A1 need to provide to instant communication client B1 an identification of a device of the other party for communication. Such identification can be an identification representing a specific communication party (such as an instant communication account), or an identification representing a randomly found communication party. Such identification can be directly included in the communication request sent by software application A1 to instant communication client B1. Instant communication client B1 checks a current status of the instant communication connection according to the identification. In the case of situation (1), software applications A1 and A2 are permitted to use the current communication connection to communicate. In the cases of (2) or (3), a step 105 is continuingly performed.

S105: Instant communication client B1 establishes the instant communication connection with the remote device.

With respect to situations (2) and (3) at step S104, instant communication client B1 needs to immediately establish the instant communication connection with the corresponding remote device according to the identification of the device of the communication party provided by software application A1.

In one embodiment, the instant communication system is mainly based on two protocols: transfer control protocol (TCP), and user datagram protocol (UDP). UDP is a protocol with characteristics such that there is no need to establish a connection and a network cost is low but data transmission reliability is also low. TCP is a protocol for establishing connection and has higher data transmission reliability. In the techniques provided by the present disclosure, the communication between stand-alone software applications has a high requirement for data transmission reliability. Thus there is a need to establish a reliable (TCP) connection between instant communication clients.

Instant communication client B1 firstly sends the identification of the remote device to an instant communication server. The instant communication server returns a corresponding message to instant communication client B1 according to a specific type of the identification.

Corresponding to the above situation (2), the instant communication server directly returns to instant communication client B1 information of a user device corresponding to the identification, such as an IP address, TCP port, and other relevant information. It is appreciated that the remote device has to be at an online status at the instant communication system, otherwise the instant communication connection cannot be implemented.

Corresponding to the above situation (3), the instant communication server randomly returns to instant communication client B1 information of a user device corresponding to an online user's user device, such as an IP address, TCP port, and other relevant information, or information of multiple online users' user devices so that the local user can choose the communication party.

According to the relevant information of the remote user device returned by the server, instant communication client B1 starts to establish the instant communication connection with instant communication client B2 of the remote user device.

S106: Instant communication client B1 returns to software application A1 a responding message that the connection is successful established.

After the connection is successfully established, instant communication client B1 returns to software application A1 the message that the connection is established. Such step is optional. Afterwards, software applications A1 and A2 can use the instant communication connection established by instant communication clients B1 and B2 to communicate with each other. According to requirements of detailed network functions of the software applications and network environments and other factors, a point-to-point connection can be used or the instant communication server can be used for communication. The present disclosure does not limit the detailed implementations.

SECOND EXAMPLE

In the method of the first embodiment, the stand-alone software application initiates the communication. In practical applications, a more common situation is that users are using the instant communication system to communicate (i.e. instant communication clients B1 and B2 have already established the instant communication connection). The local user desires to run a specific stand-alone software application to interact with a remote user. In other words, an initiator of a communication process is the instant communication client B1 on the local device. With respect to this specific situation, the present disclosure provides another method to implement communication of stand-alone software applications. A method is shown in the FIG. 2 which will be described below.

Figure 2:
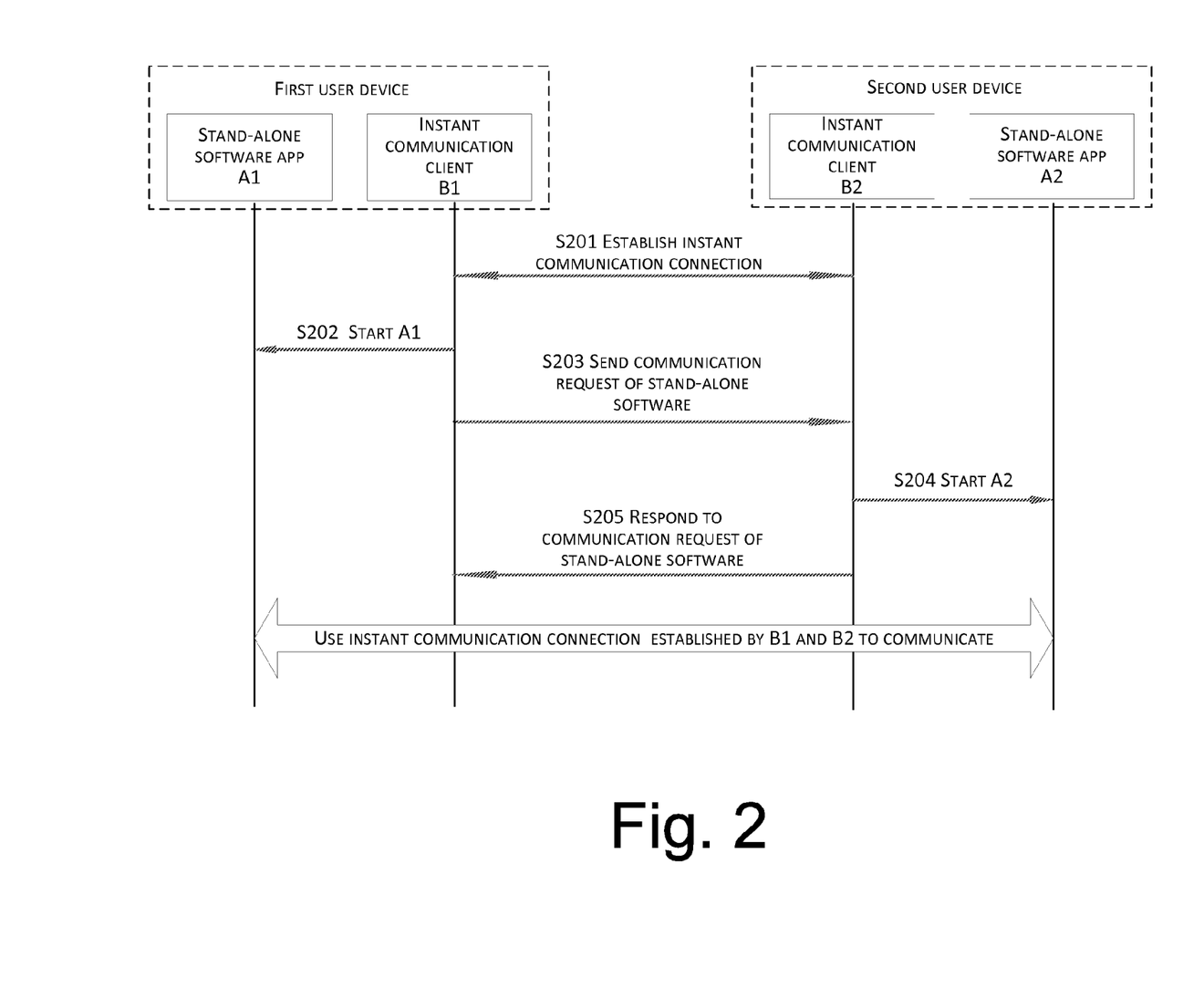
FIG. 2 illustrates a diagram of a method for communication of stand-alone software in accordance with a second embodiment of the present disclosure.

S201: Instant communication client B1 establishes an instant communication connection with instant communication client B2.

In this embodiment, before initiation of the stand-alone software application, the local user device first establishes the instant communication connection S202: Instant communication client B1 starts the stand-alone software application A1 at the local user device.

When the user desires to run the specific software application A1, instant communication client B1 directly starts software application A1. It is equivalent that the local instant communication client directly permits software application A1 to use the instant communication connection, thereby saving the step of authentication.

In the current technologies, there are two methods used to start a software application by the instant communication client, namely: (1) opening an independent window separate from a chatting window and running the software in the independent window; and (2) enlarging the chatting window and embedding the software application in the chatting window to run. Disadvantages of the above method (1) include: a weak combination between the software application and the chatting window, short of singularity, and failure to implement movement of the software application along with the chatting window. Thus the user often could not perceptually associate the software function with the chatting window. Disadvantages of the method (2) are that an interface cannot be changed anytime during usage of the software application and there is less flexibility.

With regards to the above issues, this embodiment provides a method for starting the software application at the instant communication client: instant communication client B1 creates an extended window based on the current instant communication chatting window, and starts software application A1 in the extended window. Such method has following advantages:

(1) In a running process of software application A1, when there is a need to change its size because of change of interface for different functions, software application A1 can send the request to the extended window managed by instant communication client B1. When the extended window receives the request from software application A1 to change the size, it immediately adjusts its size to accommodate the change of interface of software application A1. There is no limit to the number of times and frequencies of the self-adjusted size change of the extended window. Such adjustment can be conducted anytime in response to software application A1's request.

(2) Multiple software applications can be loaded onto the same extended window. Such software applications include a software application with network functional requirement and may also include a stand-alone software application. Such software applications can work in parallel without interfering each other. For example, when software application A1 is already running on the extended window, if the user starts another software application A11 based on the extended window, software applications A11 and A1 can work in parallel. The user can switch operation interfaces of the two software applications by a switch apparatus at the extended window. During the switching, the extend window can always self-adjust according to the size change of interface of the current software application that the user is using.

It is appreciated that the instant communication client can start multiple stand-alone software applications on the local user device in different extended windows. The present disclosure does not make restriction in this respect.

(3) The extended window can move together with the chatting window or move independently. In a situation that there is already a software application running on the extended window, if the user moves a position of the chatting window, the extended window can adhere to the chatting window to change its position at the same time. A relative position between the extended window and the chatting window will not change. If the user moves the extended window out of the chatting window, a change of position of the chatting window and a change of position of the extended window are independent from each other and do not influence with each other. The user can drag the extended window to any position on a screen as the user desires.

S203: Instant communication client B1 sends a communication request for one or more stand-alone software applications to instant communication client B2.

After instant communication client B1 starts software application A1, it sends the communication request for one or more stand-alone software applications to instant communication client B2 on the remote user device. The communication request also includes an identification of the stand-alone software applications A1 so that instant communication client B2 can start a software application that corresponds to, or is identical to, software application A1.

This step can be triggered by the user or automatically implemented by instant communication client B1. In a situation that the step is automatically implemented by instant communication client B1, as the software application to be started by instant communication client B1 can be a software application with network function requirements or a general stand-alone software application, instant communication client B1 can firstly check whether software application A1 needs to be used by the user through a network interaction. If affirmative, instant communication client B1 sends the communication request for the one or more stand-alone software applications to instant communication client B2.

S204: Instant communication client B2 receives the communication request for the one or more stand-alone software applications.

According to the identification of the one or more sand-alone software applications included in the communication request for the one or more stand-alone software applications, instant communication client B2 starts the stand-alone software application A2 on the local user device. An operation to start software application A2 can be automatically implemented by instant communication client B2. Alternatively, instant communication client B2 can send the notification message to the user and the user determines whether to start software application A2. A method that instant communication client B2 starts software application A2 can be the same as the method that instant communication client B1 starts software application A1.

In this step, if instant communication client B2 does not detect a corresponding software application at the local device, it can prompt the user to download the software, or refuse the communication request for one or more stand-alone software applications sent by instant communication client B1.

S205: After starting software application A2, instant communication client B2 sends a communication request for one or more stand-alone software applications to respond.

Now software applications A1 and A2 can use the instant communication connection established by instant communication clients B1 and B2 to communicate.

In this embodiment, with regards to the situation that there already exists the instant communication connection between the communication parties, the instant communication client starts the whole communication process. Compared with the first embodiment, on a premise that communication reliability is not damaged, this embodiment saves steps such as authentication and other local interaction steps. On the other hand, this embodiment also provides a method for starting one or more software applications in the extended window to implement better user experience.

THIRD EXAMPLE

Figure 3:
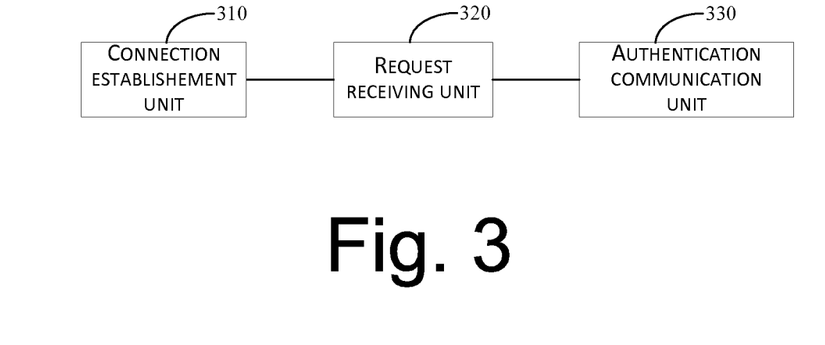
FIG. 3 illustrates an exemplary apparatus to implement communication of stand-alone software in accordance with a third embodiment of the present disclosure.

Corresponding to the first embodiment, the present disclosure also provides an apparatus for implementing communication of stand-alone software applications on a local user device and a remote user device. Referring to FIG. 3, the apparatus includes a number of components as described below.

A connection establishment unit 310 is configured to establish an instant communication connection between the local user device and the remote user device.

A request receiving unit 320 is configured to receive a communication request sent by a stand-alone software application A1 on the local user device.

An authentication communication unit 330 is configured to authenticate software application A1. If software application A1 passes the authentication, the authentication communication unit 330 permits software application A1 to use the instant communication connection to communicate with a stand-alone software application A2 on the remote user device. The stand-alone software application A1 and the stand-alone software application A2 may be identical software applications.

FOURTH EXAMPLE

Figure 4:
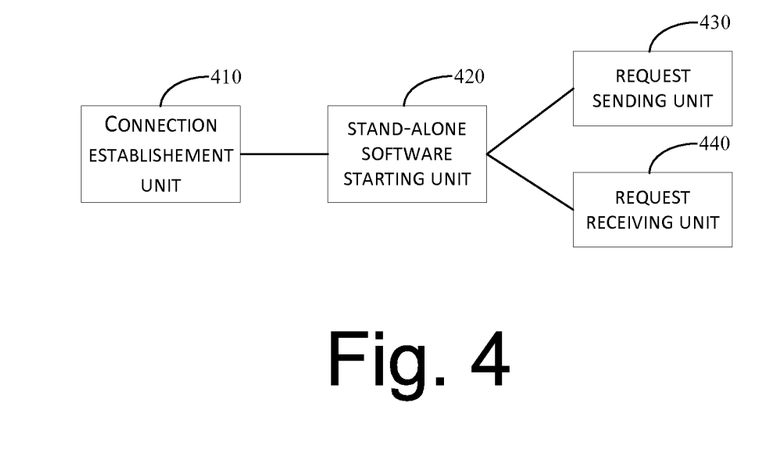
FIG. 4 illustrates an exemplary apparatus to implement communication of stand-alone software in accordance with a fourth embodiment of the present disclosure.

Corresponding to the second embodiment, the present disclosure also provides another apparatus for implementing communication of stand-alone software applications on a local user device and a remote user device. Referring to FIG. 4, the apparatus includes: a connection establishment unit 410, a stand-alone software starting unit 420, a request sending unit 430, and a request receiving unit 440.

The connection establishment unit 410 is configured to establish an instant communication connection between the local user device and the remote user device. The stand-alone software starting unit 420 is configured to start a stand-alone software A1 on the local user device, and the request sending unit 430 is configured to send a communication request to the remote user device for communication with one or more stand-alone software applications. The communication request for communication with one or more stand-alone software applications includes an identification of the stand-alone software application A1.

The request receiving unit 440, when installed on the remote user device, is configured to receive the communication request for communication with one or more stand-alone software applications. The stand-alone software starting unit 420, when installed on the remote user device, is configured to start a stand-alone software application A2 on the remote user device according to the identification of the first stand-alone software application A1 included in the communication request.

The stand-alone software application A1 and the stand-alone software application A2 use the instant communication connection established by the connection establishment unit 410 to communicate.

The stand-alone software starting unit 420 can specifically include: an extended window creation sub-unit configured to create an extended window of the chatting window for instant communication, and a starting sub-unit configured to start the one or more stand-alone software applications in the extended window.

For the sake of convenient description, the above apparatuses are functionally divided into various units which are separately described. When implementing the disclosed apparatuses, the functions of various units may be implemented in one or more instances of software and/or hardware.

From the exemplary embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of computer-executable instructions or code stored in one or more non-transitory computer-readable storage media such as ROM/RAM, flash memory, EEROM, USB memory device, hard drive and optical disk, for example. When executed, the computer-executable instructions allow a computing device (e.g., personal computer, server or networked device) to carry out one or more of the methods described in the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary apparatus embodiment has been described in a relatively simple manner because of its fundamental correspondence with the exemplary method. Details thereof can be referred to related portions of the exemplary method. Descriptions of the above exemplary apparatus are meant for illustrative purpose only. Units described as separate components therein may or may not be physically separated. Components illustrated in terms of units may or may not be physical units, e.g., may be located in one place or may be distributed among multiple network units. Depending on the actual needs, the goal of the exemplary embodiments may be achieved by selecting parts or all of the modules. One of ordinary skill in the art can understand and implement the disclosed embodiments without any innovative effect.

The present disclosure may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and remote computers.

Above are only preferred exemplary embodiments of the present disclosure. However, the present disclosure is not limited hereto. It is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method for implementing communication of stand-alone software applications, the method comprising:

establishing, by a first instant communication client of a first user device, an instant communication connection between the first user device and a second user device, the first user device and the second user device being remote from each other;

performing a dual connection compatibility check between a first stand-alone software application and a first instant communication client on the first user device, the dual connection compatibility check comprising determining whether the first stand-alone software application is authenticated by confirming an identity of a current user to use the first instant communication client and determining whether the first stand-alone software application is compatible with the first instant communication client to correctly use the instant communication connection with the first instant communication client to communicate with a second stand-alone software application at the second user device; and allowing the first stand-alone software application on the first user device to communicate with the second stand-alone software application on the second user device via the instant communication connection.

2. The method as recited in claim 1, further comprising:
receiving, by the first instant communication client, a communication request from the first stand-alone software application.

3. The method as recited in claim 2, wherein the communication request includes an identification of the second user device, wherein allowing the first stand-alone software application on the first user device to communicate with the second stand-alone software application on the second user device via the instant communication connection comprises:

checking whether the instant communication connection exists between the first instant communication client and the second instant communication client according to the identification of the second user device;

if affirmative, allowing the first stand-alone software application to communicate with the second stand-alone software application via the instant communication connection; and if not affirmative, the first instant communication client establishing the instant communication connection with the second instant communication client according to the identification of the second user device, and allowing the first stand-alone software application to communicate with the second stand-alone software application via the instant communication connection.

4. The method as recited in claim 1, wherein allowing the first stand-alone software application on the first user device to communicate with the second stand-alone software application on the second user device via the instant communication connection comprises:

the first instant communication client establishing the instant communication connection with the second instant communication client;

the first instant communication client starting the first stand-alone software application on the first user device;

the first instant communication client sending a communication request to the second instant communication client, the communication request for the first stand-alone software application including an identification of the first stand-alone software application;

the second instant communication client receiving the communication request for the first stand-alone software application;

the second instant communication client starting the second stand-alone software application on the second user device according to the identification included in the communication request for the first stand-alone software application; and the first stand-alone software application communicating with the second stand-alone software application via the instant communication connection established by the first instant communication client and the second instant communication client.

5. The method as recited in claim 4, wherein the first instant communication client starting the first stand-alone software application on the first user device comprises:

the first instant communication client establishing an extended window of an instant communication chatting window; and the first instant communication client starting the first stand-alone software application at the extended window.

6. The method as recited in claim 5, further comprising the first instant communication client starting a third stand-alone software application on the first user device, the third stand-alone software application being different from the first stand-alone software application, wherein the first instant communication client starts the third software application at the extended window where the first stand-alone software application is started.

7. The method as recited in claim 5, further comprising the first instant communication client starting a third stand-alone software application on the first user device, the third stand-alone software application being different from the first stand-alone software application, wherein the first instant communication client starts the third software application at another extended window that is different from the extended window where the first stand-alone software application is started.

8. The method as recited in claim 4, wherein, prior to the first instant communication client sending the communication request the first stand-alone software application to the second instant communication client, the method further comprises:

the first instant communication client checking whether the first stand-alone software application needs to be used by the current user through a network interaction;

when the first stand-alone software application needs to be used by the current user through the network interaction, the first instant communication client sending the communication request for the first stand-alone software application to the second instant communication client.

9. An apparatus, comprising:

a connection establishment unit that establishes an instant communication connection between a local user device and a remote user device;

a request receiving unit that receives a communication request from a first stand-alone software application at the local user device; and an authentication communication unit that performs a dual connection compatibility check between the first stand-alone application and a first instant communication client on the local user device, the dual connection compatibility check comprising determining whether the first stand-alone software application is authenticated by confirming an identity of a current user to use the first instant communication client and determining whether the first stand-alone software application is compatible with the first instant communication client to correctly use the instant communication connection with the first instant communication client to communicate with a second stand-alone software application at the remote user device, in an event that the first stand-alone software application passes the dual connection compatibility check, the authentication communication unit permitting the first stand-alone software application to communicate with the second stand-alone software application at the remote user device via the instant communication connection.

10. The apparatus as recited in claim 9, wherein determining whether the first stand-alone software application is compatible with the first instant communication client comprises checking an edition number or a revision number of the first stand-alone software application or sending specific testing data to the first stand-alone software application.

11. The apparatus as recited in claim 9, wherein the stand-alone software starting unit further creates an extended window that is separate from a chatting window of the first instant communication client, and loads the first stand-alone software application at the extended window.

12. The apparatus as recited in claim 11, wherein the stand-alone software starting unit further starts and loads a third stand-alone software application on the local user device at the extended window where the first stand-alone software application is loaded, the third stand-alone software application being different from the first stand-alone software application.

13. The apparatus as recited in claim 11, wherein the extended window moves in response to a movement of the chatting window.

14. The apparatus as recited in claim 13, wherein a relative position between the extended window and the chatting window is unchanged.

15. An apparatus for implementing communication of stand-alone software at a local user device and a remote user device, the apparatus comprising:
- a connection establishment unit that establishes an instant communication connection between the local user device and the remote user device;
- a stand-alone software starting unit that starts a first stand-alone software application on the local user device;
- an authentication communication unit that performs a dual connection compatibility check between the first stand-alone software application and a first instant communication client on the local user device, the dual connection compatibility check comprising determining whether the first stand-alone software application is authenticated by confirming an identity of a current user to use the first instant communication client and determining whether the first stand-alone software application is compatible with the first instant communication client to correctly use the instant communication connection with the first instant communication client to communicate with a second stand-alone software application at the remote user device;
- a request sending unit that sends a first communication request to the remote user device for communication with the second stand-alone software applications on the remote user device; and
- a request receiving unit that receives a second communication request from the remote user device for communication with the first stand-alone software application.

16. The apparatus as recited in claim 15, wherein the stand-alone software starting unit comprises:
- an extended window creation sub-unit that creates an extended window of a chatting window for instant communication; and
- a starting sub-unit that starts the first stand-alone software application in the extended window.

17. The apparatus as recited in claim 15, wherein the first communication request includes an identification of the first stand-alone software application.

18. The apparatus as recited in claim 15, wherein the second communication request includes an identification of the second stand-alone software application.

19. The apparatus as recited in claim 15, wherein the stand-alone software starting unit starts the first stand-alone software application on the local user device in response to the request receiving unit receiving the second communication request from the remote user device for communication with the first stand-alone software application.

20. The apparatus as recited in claim 15, wherein determining whether the first stand-alone software application is compatible with the first instant communication client comprises checking an edition number or a revision number of the first stand-alone software application or sending specific testing data to the first stand-alone software application.

* * * * *